(12) United States Patent
Orner et al.

(10) Patent No.: US 9,925,592 B2
(45) Date of Patent: Mar. 27, 2018

(54) METHOD FOR FABRICATING A GOLD NANOPARTICLE

(75) Inventors: Brendan Patrick Orner, Singapore (SG); Rongli Fan, Singapore (SG); Shu Wen Chew, Singapore (SG); Vee Vee Cheong, Singapore (SG)

(73) Assignee: Nanyang Technological University, Singapore (SG)

( * ) Notice: Subject to any disclaimer, the term of this patent is extended or adjusted under 35 U.S.C. 154(b) by 1211 days.

(21) Appl. No.: 13/245,233

(22) Filed: Sep. 26, 2011

(65) Prior Publication Data
US 2012/0134873 A1 May 31, 2012

Related U.S. Application Data

(60) Provisional application No. 61/386,069, filed on Sep. 24, 2010.

(51) Int. Cl.
*B22F 9/24* (2006.01)
*B22F 1/00* (2006.01)
(Continued)

(52) U.S. Cl.
CPC .............. *B22F 9/24* (2013.01); *B22F 1/0018* (2013.01); *B82Y 30/00* (2013.01); *B82Y 40/00* (2013.01); *B22F 2999/00* (2013.01)

(58) Field of Classification Search
CPC .... B22F 1/0018; B22F 1/0022; B22F 1/0025; B22F 1/0044; B22F 2001/0029;
(Continued)

(56) References Cited

U.S. PATENT DOCUMENTS

| 6,815,063 B1 * | 11/2004 | Mayes | ................... B82Y 25/00 252/62.52 |
| 7,588,624 B2 * | 9/2009 | Mirkin | ................. B22F 1/0018 75/343 |

(Continued)

FOREIGN PATENT DOCUMENTS

WO    WO2007142082    * 12/2007    .............. B01J 13/00

OTHER PUBLICATIONS

Yongsoon Shin, Alice Dohnalkova, Yuehe Lin, "Preparation of Homogeneous Gold-Silver Alloy Nanoparticles Using the Apoferritin Cavity as a Nanoreactor," Journal of Physical Chemistry C, 114 (2010), pp. 5985-5989.*

(Continued)

*Primary Examiner* — Scott Kastler
*Assistant Examiner* — Vanessa T Luk
(74) *Attorney, Agent, or Firm* — Alston & Bird LLP

(57) ABSTRACT

The present invention is directed to a method for fabricating a gold nanoparticle, the method comprising the steps of contacting a gold ion with a protein, wherein the protein has an inner cavity that can accommodate the gold ion, separating the protein with the encapsulated gold ion(s) from non-encapsulated gold ions, contacting the protein-encapsulated gold ion with a first reductant to reduce the gold ion and form a gold nanocluster seed in the inner cavity of the protein, wherein the first reductant is a strong reductant, and contacting the gold nanocluster seed in the inner cavity of the protein with a second reductant to mineralize and grow the gold nanoparticle.

12 Claims, 13 Drawing Sheets

(51) Int. Cl.
B82Y 30/00 (2011.01)
B82Y 40/00 (2011.01)

(58) Field of Classification Search
CPC ...... B22F 2001/0033; B22F 2001/0037; B22F 9/16; B22F 9/18; B22F 9/20; B22F 9/24; B22F 2301/25; B22F 2301/255; B22F 2304/05; B22F 2304/052; B22F 2304/054; B22F 2304/056; B22F 2304/058
See application file for complete search history.

(56) References Cited

U.S. PATENT DOCUMENTS

| | | | |
|---|---|---|---|
| 8,048,193 B2* | 11/2011 | Taniuchi et al. | 75/371 |
| 2006/0235087 A1* | 10/2006 | Alexandridis et al. | 516/78 |
| 2009/0029148 A1* | 1/2009 | Hashimoto et al. | 428/323 |

OTHER PUBLICATIONS

A.N. Shipway, E. Katz, I. Willner; "Nanoparticle Arrays on Surfaces for Electronic, Optical, and Sensor Applications"; ChemPhysChem 2000, pp. 19-52.
N. L. Rosi, C. A. Mirkin; "Nanostructures in Biodiagnostics"; Chem. Rev. 2005, 105, pp. 1547-1562.
I. Yamashita; "Biosupramolecules for nano-devices: biomineralization of nanoparticles and their applications"; J. Mater. Chem. 2008, 18, pp. 3813-3820.
M. B. Dickerson, K. H. Sandhage, R. R. Naik; "Protein- and Peptide-Directed Syntheses of Inorganic Materials"; Chem. Rev. 2008, 108, pp. 4935-4978.
S. Mann, F. C. Meldrum; "Controlled Synthesis of Inorganic Materials using Supramolecular Assemblies"; Adv. Mater. 1991, 3, pp. 316-318.
F. C. Meldrum, V. J. Wade, D. L. Nimmo, B. R. Heywood, S. Mann; "Synthesis of inorganic nanophase materials in supramolecular protein cages"; Nature 1991, 349, pp. 684-687.
P. M. Harrison, P. Arosio; "The ferritins: molecular properties, iron storage function and cellular regulation"; Biochim. Biophys. Acta Bioenergetics 1996, 1275, pp. 161-203.
E. C. Theil; "Ferritin: Structure, Gene Regulation, and Cellular Function in Animals, Plants, and Microorganisms"; Ann. Rev. Biochem. 1987, 56, pp. 289-315.
T. Douglas, D. R. Ripoll; "Calculated electrostatic gradients in recombinant human H-chain ferritin"; Protein Sci. 1998, 7, pp. 1083-1091.
T. Ueno, M. Suzuki, T. Goto, T. Matsumoto, K. Nagayama, Y. Watanabe, Angew; "Size-Selective Olefin Hydrogenation by a Pd Nanocluster Provided in an Apo-Ferritin Cage"; Chem. Int. Ed. 2004, 43, pp. 2527-2530.
R. M. Kramer, C. Li, D. C. Carter, M. O. Stone, R. R. Naik; "Engineered Protein Cages for Nanomaterial Synthesis"; J. Am. Chem. Soc. 2004, 126, pp. 13282-13286.
M. T. Klem, D. Willits, D. J. Solis, A. M. Belcher, M. Young, T. Douglas; "Bio-inspired Synthesis of Protein-Encapsulated CoPt Nanoparticles"; Adv. Funct. Mater. 2005, 15, pp. 1489-1494.
J. M. Dominguez-Vera, N. Galvez, P. Sanchez, A. J. Mota, S. Trasobares, J. C. Hernandez, J. J. Calvino; "Size-Controlled Water-Soluble Ag Nanoparticles"; Eur. J. Inorg. Chem. 2007, pp. 4823-4826.
N. Galvez, B. Fernandez, E. Valero, P. Sanchez, R. Cuesta, J. M. Dominguez-Vera; "Apoferritin as a nanoreactor for preparing metallic nanoparticles"; C. R. Chim. 2008, 11, pp. 1207-1212.
C. A. Butts, J. Swift, S. G. Kang, L. Di Costanzo, D. W. Christianson, J. G. Saven, I. J. Dmochowski; "Directing Noble Metal Ion Chemistry within a Designed Ferritin Protein"; Biochemistry 2008, 47, pp. 12729-12739.

R. Tsukamoto, K. Iwahor, M. Muraoka, I. Yamashita; "Synthesis of $Co_3O_4$ Nanoparticles Using the Cage-Shaped Protein, Apoferritin"; Bull. Chem. Soc. Jap. 2005, 78, pp. 2075-2081.
F. C. Meldrum, B. R. Heywood, S. Mann; "Magnetoferritin: In Vitro Synthesis of a Novel Magnetic Protein"; Science 1992, 257, pp. 522-523.
M. Allen, D. Willits, J. Mosolf, M. Young, T. Douglas; "Protein Cage Constrained Synthesis of Ferrimagnetic Iron Oxide Nanoparticles"; Adv. Mater. 2002, 14, pp. 1562-1565.
T. Douglas, V. T. Stark; "Nanophase Cobalt Oxyhydroxide Mineral Synthesized within the Protein Cage of Ferritin"; Material Inorg. Chem. 2000, 39, pp. 1828-1830
M. Okuda, K. Iwahori, I. Yamashita, H. Yoshimura; Fabrication of Nickel and Chromium Nanoparticles Using the Protein Cage of Apoferritin; Biotechnol. Bioeng. 2003, 84, pp. 187-194.
M. T. Klem, J. Mosolf, M. Young, T. Douglas; "Photochemical Mineralization of Europium, Titanium, and Iron Oxyhydroxide Nanoparticles in the Ferritin Protein Cage"; Inorg. Chem. 2008, 47, pp. 2237-2239.
M. Li, C. Viravaidya, S. Mann; "Polymer-Mediated Synthesis of Ferritin-Encapsulated Inorganic Nanoparticles"; Small 2007, 3, pp. 1477-1481.
K. K. W. Wong, S. Mann; "Biomimetic Synthesis of Cadmium Sulfide-Ferritin Nanocomposites"; Adv. Mater. 1996, 8, pp. 928-932.
K. Iwahori, T. Enomoto, H. Furusho, A. Miura, K. Nishio, Y. Mishima, I. Yamashita; "Cadmium Sulfide Nanoparticle Synthesis in Dps Protein from Listeria Innocua"; Chem. Mater. 2007, 19, pp. 3105-3111.
I. Yamashita, J. Hayashi, M. Hara; "Bio-template Synthesis of Uniform CdSe Nanoparticles Using Cage-shaped Protein, Apoferritin"; Chem. Lett. 2004, 33, pp. 1158-1159.
R. M. Xing, X. Y. Wang, L. L. Yan, C. L. Zhang, Z. Yang, X. H. Wang, Z. J. Guo; "Fabrication of water soluble and biocompatible CdSe nanoparticles in apoferritin with the aid of EDTA"; Dalton Trans. 2009, pp. 1710-1713.
K. Iwahori, K. Yoshizawa, M. Muraoka, I. Yamashita; "Fabrication of ZnSe Nanoparticles in the Apoferritin Cavity by Designing a Slow Chemical Reaction System"; Inorg. Chem. 2005, 44, pp. 6393-6400.
B. Hennequin, L. Turyanska, T. Ben, A. M. Beltran, S. I. Molina, M. Li, S. Mann, A. Patane, N. R. Thomas; "Aqueous Near-Infrared Fluorescent Composites Based on Apoferritin-Encapsulated PbS Quantum Dots"; Adv. Mater. 2008, 20, pp. 3592-3596.
H. Yoshimura; "Protein-Assisted Nanoparticle Synthesis"; Colloids Surf. A 2006, 282, pp. 464-470.
A. Treffry, P. M. Harrison; "Spectroscopic Studies on the Binding of Iron, Terbium, and Zinc by Apoferrtin"; J. Inorg. Biochem. 1984, 21, pp. 9-20.
B. Webb, J. Frame, Z. Zhao, M. L. Lee, G. D. Watt; "Molecular Entrapment of Small Molecules within the Interior of Horse Spleen Ferritin"; Arch. Biochem. Biophys. 1994, 309, pp. 178-183.
L. Zhang, J. Swift, C. A. Butts, V. Yerubandi, I. J. Dmochowski; "Structure and Activity of apoferritin-stabilized gold nanoparticles"; J. Inorg. Biochem. 2007, 101, pp. 1719-1729.
N. R. Jana, L. Gearheart, C. J. Murphy; "Wet Chemical Synthesis of High Aspect Ratio Cylindrical Gold Nanorods"; J. Phys. Chem. B 2001, 105, pp. 4065-4067.
K. L. Kelly, E. Coronado, L. L. Zhao, G. C. Schatz; "The Optical Properties of Metal Nanopoarticles: The influence of Size, Shape, and Dielectric Environment"; J. Phys. Chem. B 2003, 107, pp. 668-677.
M. C. Daniel, D. Astruc; Gold Nanoparticles: Assembly, Supramolecular Chemistry, Quantum-Size-Related Properties, and Applications toward Biology, Catalysis, and Nanotechnology, Chem. Rev. 2004, 104, pp. 293-346.
C. Burda, X. B. Chen, R. Narayanan, M. A. El-Sayed; "Chemistry and Properties of Nanocrystals of Different Shapes"; Chem. Rev. 2005, 105, pp. 1025-1102.
P. M. Harrison, S. C. Andrews, P. J. Artymiuk, G. C. Ford, J. R. Guest, J. Hirzmann, D. M. Lawson, J. C. Livingstone, J. M. A.

(56) References Cited

OTHER PUBLICATIONS

Smith, A. Treffry, S. J. Yewdall; "Probing Structure-Function Relations in Ferritin and Bacterioferritin"; Adv. Inorg. Chem. 1991, 36, pp. 449-486.

R. L. Fan, A. L. Boyle, V. V. Cheong, S. L. Ng, B. P. Orner; "A Helix Swapping Study of Two Protein Cages"; Biochemistry 2009, 48, pp. 5623-5630.

J. Aizenberg, A. Tkachenko, S. Weiner, L. Addadi, G. Hendler, "Calcitic Microlenses as Part of the Photoreceptor System in Brittlestars", Nature, 2001, 412, pp. 819-822.

Daisuke Ishii, Kazushi Kinbara, Yasuhiro Ishida, Noriyuki Ishii, Mina Okochi, Masafumi Yohda & Takuzo Aida, "Chaperonin-mediated stabilization and ATP-triggered release of semiconductor nanoparticles", Nature, 2003, 423, pp. 628-632.

Chen, C.; Daniel, M.-C.; Quinkert, Z. T.; De, M.; Stein, B.; Bowman, V. D.; Chipman, P. R.; Rotello, V. M.; Kao, C. C.; Dragnea, B., "Nanoparticle-Templated Assembly of Viral Protein Cages", Nano Lett. 2006; 6(4); pp. 611-615.

M. Knez, M. Sumser, A. M. Bittner, C. Wege, H. Jeske, T. P. Martin and K. Kern; "Spatially Selective Nucleation of Metal Clusters on the Tobacco Mosaic Virus"; Adv. Funct. Mater., 2004, 14, pp. 116-124.

Mao, C.; Solis, D. J.; Reiss, B. D.; Kottmann, S. T.; Sweeney, R. Y.; Hayhurst, A.; Georgiou, G.; Iverson, B.; Belcher, A. M.; "Virus-Based Toolkit for the Directed Synthesis of Magnetic and Semiconducting Nanowires"; Science 2004, 303, pp. 213-217.

\* cited by examiner

METHOD FOR FABRICATING A GOLD NANOPARTICLE

CROSS-REFERENCE TO RELATED APPLICATION

This application makes reference to and claims the benefit of priority of an application for "Method for the fabrication of gold nanoparticles inside protein cages requiring no modification of the protein" filed on Sep. 24, 2010 with the United States Patent and Trademark Office, and there duly assigned Ser. No. 61/386,069. The content of said application filed on Sep. 24, 2010 is incorporated herein by reference for all purposes, including an incorporation of any element or part of the description, claims or drawings not contained herein.

TECHNICAL FIELD

Various embodiments relate to the field of nanoparticles, in particular, method of fabricating gold nanoparticles inside protein cages.

BACKGROUND

Inorganic nanomaterials have attracted extensive attention as a result of their emerging properties and their potential for a multitude of applications such as electronics, catalysis, sensors, and medical diagnosis. Many of the applications for inorganic nanomaterials, for example, metallic nanomaterials especially those composed of gold and silver, have exploited their surface plasmon resonance (SPR) properties, which are sensitive to the size, shape, composition and chemical environment of the metallic nanomaterials. With the hope of discovering novel properties for future applications, various methods have been developed to synthesize inorganic nanomaterials. Based on the unique requirements of various applications, inorganic nanomaterials have been fabricated through a variety of physical and chemical methods. Many of these methods require extreme conditions such as high temperature, elevated pressure, organic solvents, caustic pH and strong reducing reagents.

The use of biological systems, inspired by naturally evolved processes, is an emerging trend in their fabrication, and it has been reported that material size, shape, and morphology can be controlled by interactions between biomolecules and inorganic materials. During the last few decades, quite a few approaches have been developed to synthesize gold nanoparticles due to their many useful applications. These chemical methods to synthesize gold nanoparticles can be placed in two categories. One utilizes citrate to reduce gold ions in aqueous solution while the other one employs strong binding ligands to transfer gold ions from water to an organic layer where the gold ions are reduced by $NaBH_4$ in the presence of surfactants. Gold nanoparticles synthesized by these two approaches usually require further functionalization to be utilized in future applications. To avoid additional modification steps, biomolecules including amino acids, peptides and proteins have been employed to fabricate gold nanoparticles and some of these reports have shown that the morphology, size and lattice structure can be regulated by different biomolecules.

Amino acids are small biomolecules which serve as the building blocks for protein synthesis. Amino acids have been employed as simple biotemplates to prepare gold nanomaterials and play an essential role in stabilizing the nanomaterial.

It was found that by incubating various amino acids such as lysine, arginine, tryptophan, tyrosine, and aspartic acid, with tetrachloroaurate in an aqueous solution at room temperature for about 12 hours, with lysine, arginine or tryptophan spherical gold nanoparticles can be produced, while with tyrosine both spherical and rod-shape nanoparticles are formed. It was also interestingly found that with aspartic acid single crystal hexagonal and truncated triangular shaped gold nanoplates in (111) facet can be formed. It was postulated that aspartic acid can specifically interact with the (111) gold crystalline face, thereby promoting local reduction at the interaction region. Taken together, the results indicate that shape and crystal preference can be regulated by the type of amino acid used.

The synthesis of tyrosine-, glycyl-L-tyrosine-, and arginine-reduced gold nanoparticles in alkaline conditions has also been reported. The size of the tyrosine-prepared nanoparticles was larger, on average, compared to those reduced by glycyl-L-tyrosine in identical conditions. L-arginine-prepared particles exhibited a larger size and unique morphology. In addition it was found that the size of the particles could be increased by lowering the gold concentration.

Together these data indicate that the size and morphology of the resulting nanomaterials could be manipulated by using amino acids with presumed different reduction potentials and by varying gold ion concentrations. More generally, it was demonstrated that amino acids can serve as reducing agents to initiate the growth of gold nanomaterials and stabilize them in aqueous solution.

Proteins and peptides, due to their large structural and functional diversity and their ready availability, have high utility in the manipulation of materials.

Peptides are polymers of amino acids linked by peptide bonds. Depending on the number of amino acids in the peptide molecule, one can, for example, differentiate between dipeptides, tripeptides, oligopeptides and polypeptides, to name a few. Although peptides are composed of amino acids, the conditions of amino acid-based gold nanoparticle synthesis cannot be applied to peptide-based gold nanoparticle synthesis. These differences could be due to altered projection of functionality which is a result of secondary structure formation in the peptides. As these conformationally related effects, combined with the opportunity to combine functional groups with varied chemical properties, could potentially afford a degree of nuanced control not available with amino acids, methods involving peptides have been the focus of much scientific interest.

A histidine rich peptide (AHHAHHAAD) was reported to possess a high affinity for metal ions and has been utilized to mediate the growth of gold nanoparticles in aqueous solution. Gold ions were mixed with the peptide in 1:1 molar ratio and nanoparticles were formed by addition of reducing agent (sodium citrate or sodium borohydride). The UV spectrum of the particles showed the characteristic plasmon resonance peak at 524 nm, and the average diameter of the particles was 9.5 nm. Immunoassays have been conducted and antibodies fused to these histidine rich peptides were able to detect the gold nanoparticles suggesting that the peptides mediate the growth of gold nanoparticles through surface recognition. With the confirmation that these peptides act as ligands, nanoparticles were produced and functionalized efficiently in one-pot synthesis without performing ligand exchange steps.

Subsequently, histidine rich peptides were immobilized on nanotubes to mediate the growth of uniform sized gold nanocrystals. The peptide-functionalized nanotubes were mixed with organic gold complex ($Cl_3AuPMe_3$). As the gold ions were slowly trapped by the histidine peptides they were crystallized by reduction with $NaBH_4$, This procedure resulted in highly monodisperse gold nanocrystals with an average diameter of 6 nm. The diffraction pattern of these particles indicated that the crystal was in the (111) and (220) facet. In a subsequent report, it was found that the packing density of gold nanocrystals could be manipulated by altering the pH and ion concentration, however, the diameter of gold nanoparticles was retained. Because the packing density on the nanotubes has significant influence on conductivity, this technology could be utilized as a conductivity-tunable building block in electronics and sensor devices.

Some other peptides like the Flg and A3 peptides (DYKDDDDK and AYSSGAPPMPPF, respectively), identified by phage display have been used to synthesize gold nanoparticles in HEPES buffer. Biotinylated anti-Flg antibody could successfully recognize Flg peptides which were ligated to the surface of gold nanoparticles during particle formation and the complexes were mixed with streptavidin coated quantum dots to form bio-assembled hybrid nanostructures. Thus, with the assistance of high throughput screening techniques like phage display, peptides that have high affinity to metal ions/particles can be easily selected and employed for further applications.

Proteins are essentially polypeptides usually composed of more than 100 amino acids. Although some proteins are composed of a single polypeptide chain, other proteins comprise two or more polypeptide chains that are linked by non-covalent interactions or disulfide bridges between cysteine residues. Generally, the linear length, functional diversity, and amino acid sequence of the proteins cause them to adopt thermally stable folds upon which their biological and molecular recognition activity depend. Various proteins have been directly utilized in the fabrication process of gold nanoparticles.

Bovine serum albumin (BSA) is a suitable protein candidate for the synthesis of gold nanoparticles, as it possesses many sulfur-, oxygen-, and nitrogen-containing amino acid residues all of which have a high affinity for gold ions. After mixing BSA with gold ions ($AuCl_4$), the reducing reagent $NaBH_4$ was added, resulting in well dispersed gold nanoparticles with an average diameter less than 2 nm.

Infrared (IR) and Raman spectroscopy indicated that the BSA backbone and the functional groups on the amino acid side chain remained intact during the reaction. The disulfide bonds in BSA, however, were broken resulting in free thiol groups available to make strong interactions with the gold nanoparticles. This study demonstrated that proteins could be conjugated to gold nanoparticles during their formation. Another protein, d-amylase was reported to reduce gold ions ($AuCl_4^-$) while maintaining its enzymatic activity. The protein was interacting with the particle surface through free thiol groups which were possibly donating electrons for the reduction. Interestingly, the active site of the enzyme which is adjacent to these implicated cysteines was not affected during the gold particle formation as enzymatic turnover could still be observed. Although many other enzymes have been screened for protein-assisted gold nanoparticle synthesis, only EcoR I could successfully produce gold nanoparticles. The only structural similarity between α-amylase and EcoR I is that both of the proteins have free cysteines which are presumably essential in the reduction of gold ions to gold nanoparticles.

Amino acids, peptides, and proteins all seem to function by surface binding of growing gold nanoparticles. The size and shape of the resulting particles depends on the affinity of this binding along with how the binding on and off rates relate to the chemical rate of the reduction of the gold. Much optimization is therefore required to produce the gold particles and their size and shape can rarely be predicted rationally from the outset. However, some proteins assemble into unique quaternary structures and therefore could serve as platforms to template gold nanoparticle formation. In these cases the resulting material could reflect the size and 3D shape of the templating protein.

It was reported to use tobacco mosaic virus (TMV), a rod shape virus 18 nm in diameter and 300 nm in length, to perform this templation by incubating with gold ions ($AuCl_4^-$) at acidic pH. After adding the reducing agent hydrazine hydrate, gold ions which bound to the TMV surface acted as nucleation sites to promote nanoparticle growth. Spherical gold nanoparticles with diameters of 8.6±3 nm densely covered the external surface of the viral capsids.

In a subsequent report, the conditions to deposit gold nanoparticles homogeneously on TMV were optimized through repeated addition of gold ions and reducing agent in aliquots in the presence of poly-L-lysine.

Biotemplate-directed syntheses have the potential to be more "green" than traditional methods due to the required mild reaction conditions such as lower temperature, near-neutral pH, and the fact that they often employ aqueous reaction solutions. Many bio-assemblies tend to have exquisite nanostructures and their components often can be manipulated easily using molecular biological techniques. Another advantage of the biotemplate approach is that new functional groups on the biomolecules could be projected onto the growing nanomaterials enabling the potential for further applications without the need of adding stabilizing agent. Moreover, the biomolecules can prevent the agglomeration of nanomaterials in high salt solutions as well as increase the solubility of nanomaterials in aqueous solutions. Proteins that assemble into nanocage structures have been reported as templates to produce many types of nanoparticles.

Ferritin is a well characterized protein that assembles into a spherical ball with a hollow interior and it is an excellent candidate for fabrication of nanoparticles due to its unique structure and high stability. The ferritin proteins assemble into robust nanoscale cages and are ubiquitously expressed in both prokaryotes and eukaryotes. The ferritin protein from horse spleen, for example, is composed of 24 subunits that form an octahedral, hollow sphere with an exterior diameter of 12 nm and an interior cavity of 7 nm. The biological function of ferritin is to sequester and mineralize Fe(O)OH inside the cavity so as to prevent cytosolic and serum iron from forming cell-destructive, reactive oxygen species. Iron is transported into the cavity through eight hydrophilic channels on the threefold symmetry axes and mineralized within the protein shell. It has been speculated that channels on the fourfold axes serve as exit pathways for cations during demineralization.

Upon removal of their mineralized cores, empty cages of ferritin (i.e., apoferritin) have been used as size-constrained reaction vessels to synthesize different types of nanoparticles including metals, oxides, hydroxides, carbonates, and semiconductors. These particles possess a narrow size distribution arising from growth restriction within the cage whose uniformity is a result of the precision of protein self-assembly. Moreover, the protein cages could enhance the solubility and chemical stability of the particles. Therefore, multiple methods have been developed to mineralize nanoparticles using ferritins.

Many of the strategies have capitalized on natural electrostatic interactions or specific binding between metal ions and the interior surface of native ferritins to increase the local concentration and thus facilitate the formation of nanoparticles. Due to the anionic nature of the ferritin cavity, and the direction of the electrostatic gradient in the ion-entry channels at the threefold axes, only cations can be successfully used with this strategy. Other strategies respond to the fact that some metal ions have a natural affinity for the ferritin exterior, or in some cases no preference for either the interior nor exterior, resulting in substantial mineralization on the outside of the ferritin. In one attempt to remedy this problem, ion-bound ferritins are first subjected to dialysis or chromatography before subsequent reduction inside the cavity. Alternatively, ammonium ions, ethylenediaminetetraacetic acid (EDTA), or polyelectrolytes have been included in the reaction solution to retard or prevent mineralization on the outside of the cage. Another strategy has been to genetically or chemically modify the proteins to endow the cavity with an enhanced ion binding affinity or the ability to promote particle formation.

The mineralization of gold nanoparticles using ferritin cages was recently reported. Reaction between either monoanionic AuCl or neutral $AuCl_3$ and unmodified horse spleen apoferritin (HSAFn) resulted only in gold mineralization on the outside of the protein, and the size of these deposits could be controlled by the choice of the reductant. In a subsequent report, human heavy chain ferritin was modified by removing solvent-exposed gold-binding amino acids, such as cysteine and histidine, from the outer surface and by lining the interior surface with cysteine residues. Gold nanoparticles were successfully incorporated inside the cavity of this modified protein by the addition of $AuCl_3$ followed by reduction with 3-(N-morpholino)propanesulfonic acid (MOPS).

Previous studies demonstrated that gold nanoparticles were generally generated outside the protein cages and some form(s) of modification of the proteins were required. As many different protein cages have distinct shapes and sizes, such strategies were limited to a specific protein cage or a specific group of protein cages. This means that these strategies could not potentially be used with any natural protein cage and any protein cage that is commercially available, Thus it is an object of the present invention to address at least the problems mentioned above and to provide a universal method for generating gold nanoparticles of different shapes and sizes encased by protective, solublizing, and easily functionalizable protein.

SUMMARY OF THE INVENTION

In a first aspect, the present invention relates to a method for fabricating a gold nanoparticle, the method comprising the steps of contacting a gold ion with a protein, wherein the protein has an inner cavity that can accommodate the gold ion, separating the protein with the encapsulated gold ion(s) from non-encapsulated gold ions, contacting the protein-encapsulated gold ion with a first reductant to reduce the gold ion and form a gold nanocluster seed in the inner cavity of the protein, wherein the first reductant is a strong reducant, and contacting the gold nanocluster seed in the inner cavity of the protein with a second reductant to mineralize and grow the gold nanoparticle.

According to a second aspect, the present invention relates to a gold nanoparticle fabricated using a method comprising the steps of contacting a gold ion with a protein, wherein the protein has an inner cavity that can accommodate the gold ion, separating the protein with the encapsulated gold ion(s) from non-encapsulated gold ions, contacting the protein-encapsulated gold ion with a first reductant to reduce the gold ion and form a gold nanocluster seed in the inner cavity of the protein, wherein the first reductant is a strong reducant, and contacting the gold nanocluster seed in the inner cavity of the protein with a second reductant to mineralize and grow the gold nanoparticle.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
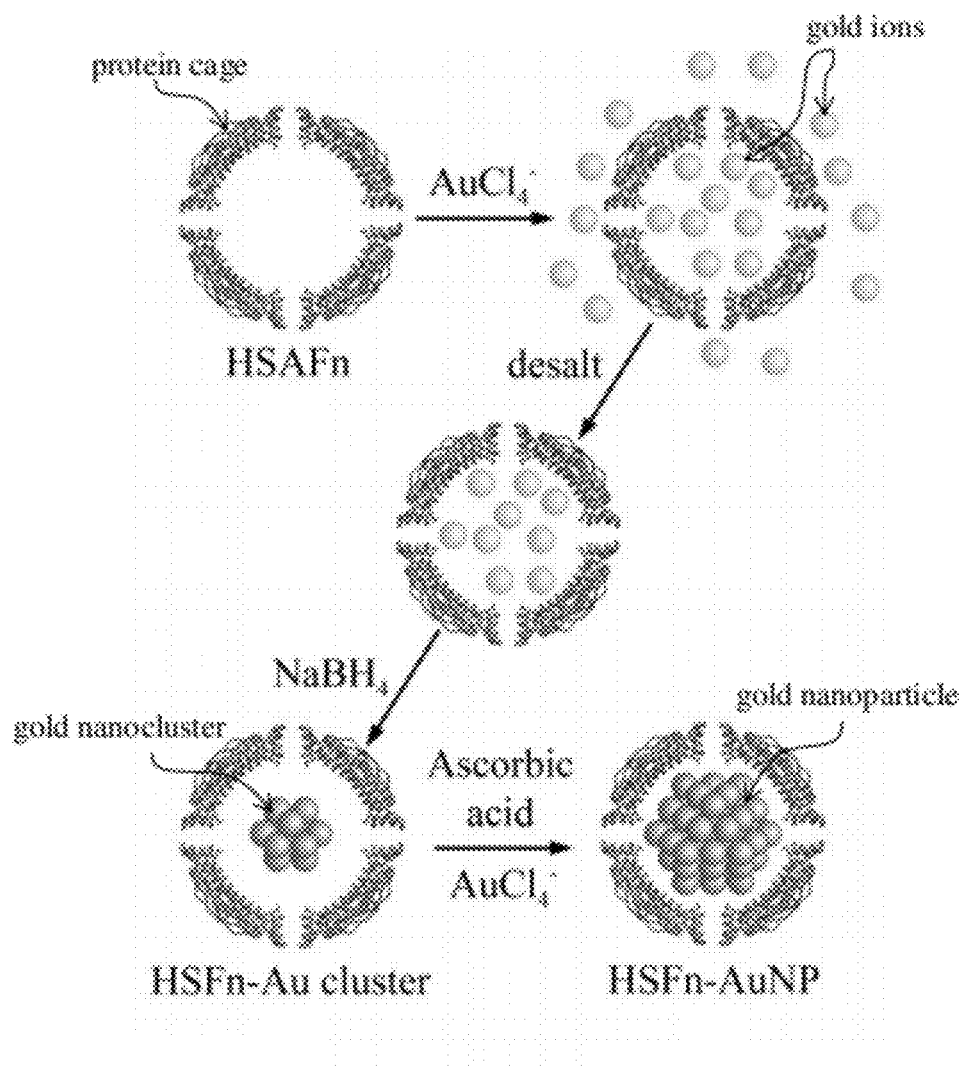
FIG. 1 shows a schematic representation of the two-step reduction strategy (procedure) to use HSAFn to mineralize gold nanoparticles, in accordance to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In a first aspect, a method for fabricating a gold nanoparticle is provided. The method comprises the steps of contacting a gold ion with a protein, wherein the protein has an inner cavity that can accommodate the gold ion, separating the protein with the encapsulated gold ion(s) from non-encapsulated gold ions, contacting the protein-encapsulated gold ion with a first reductant to reduce the gold ion and form a gold nanocluster seed in the inner cavity of the protein, wherein the first reductant is a strong reducant, and contacting the gold nanocluster seed in the inner cavity of the protein with a second reductant to mineralize and grow the gold nanoparticle.

In the context of various embodiments, the term "nanoparticle" may refer to an object of a size less than about 1 micron or 1 μm. For example, the gold nanoparticle may be about 1 nm to about 1000 nm, about 1 to about 100 nm, about 1 nm to about 10, or about 4 nm to about 8 nm in size. The gold nanoparticles may be 6.3 nm in size. Depending on the shape of the nanoparticle, the size relates to the diameter or length of the respective structure. In various embodiments, the size is the mean particle size. A gold nanoparticle may be selected from the group consisting of a gold nano sphere, a gold nanorod, a gold nanotube, a gold nanoshell, a gold nanodot and a gold nanowire.

The term "nanocluster" may generally refer to a microaggregate whose linear dimensions are of the order of nanometer ($10^{-9}$ m) scale. In particular, a "nanocluster seed" refers to a nanometer-scaled microaggregate that will grow in terms of, for example, size and structure with increased amount of aggregation under certain conditions.

In the context of various embodiments, the term "inner cavity" refers to a hollow area within the protein structure. This hollow area may have different shapes and sizes and may range from a dent in the surface of the protein over a funnel shaped cavity to hollow cavities in the inside of the protein that may be connected to the environment by one or more channels or pores that may be smaller in diameter than the hollow cavity itself. In various embodiments, this hollow area may be obtained by removal of the mineralized core of a protein, for example a metal ion binding protein, to give an empty cage used as a size-constrained reaction vessel to synthesize different types of nanoparticles including metals, oxides, hydroxides carbonates and semiconductors. As used herein, the cage or the protein cage may refer to a protein cage architecture such as that of a small virus capsids and ferritin, which is self-assembled from a limited and defined number of subunit building blocks. Protein cage architectures typically range in size of tens to hundreds of nanometers and are spherical or rod-shaped. By combining both chemical and genetic modifications of the subunits, novel functions can be imparted to the protein cage architectures that are quite different from their native function in biology. Generally, there are three distinct surfaces of the assembled protein cage architecture that can be manipulated to impart function. These surfaces include the outer surface, the interior (or inner) surface and the surface that forms the interface between the subunits. In particular, the outer surface can be used for chemical attachment of small molecules and the interior surface defining the inner cavity may be used for encapsulation of nanoparticles, sequestered inside the cage, useful for imaging and therapeutics.

In various embodiments, the protein may be selected from the group consisting of Horse Spleen Apoferritin (HAS), ferritin, ferritin-like protein, apoferritin, vault protein, and Dps (DNA-binding proteins from starved cells) protein. Example of protein cages may also include, but not limited to, viral capsids, such as CCMV (Cowpea chlorotic mottle viral), CPMV (Cowpea mosaic virus), MS2 bacteriophage and Qβ bacteriophage.

In accordance to various embodiments, the first reductant is a strong reductant. As used herein, the term "strong reductant" may be interchangably used as "strong reducing agent". Strong reducing agents easily lose or donate electrons. Generally, an atom with a relatively large atomic radius tends to be a strong reductant because the distance from the nucleus to the valence electrons is long that these electrons are not strongly attracted. The measure of a material to oxidize or lose electrons is known as its oxidation potential. By simply reversing the (polarity) sign of the oxidation potential, the corresponding reduction potential can be obtained. The reducing agent is stronger when it has a larger reduction potential and weaker when it has a smaller reduction potential.

For example, the first reductant may be selected from the group consisting of sodium borohydride ($NaBH_4$), diborane ($B_2H_6$), diisobutylaluminum hydride (($i\text{-}Bu_2AlH)_2$), lithium triethylborohydride ($LiEt_3BH$), potassium borohydride ($H_4BK$), diborane ($B_2H_6$), amineborane, ammonia borane ($H_3NBH_3$) dimethylamine borane (($CH_3)_2NH{:}BH_3$), and a mixture thereof.

In various embodiments, the second reductant may be a weak reductant. As opposed to a strong reductant, a weak reductant refers to an agent which easily or relatively easily gains or accepts electrons.

For example, the weak reductant may be selected from the group consisting of ascorbic acid ($C_6H_8O_6$) and a salt thereof, citrate, potassium bitartrate ($KC_4H_5O_6$), potassium tartrate ($K_2C_4H_4O_6$), L-cysteine, thioglycerol, sodium tartrate ($Na_2C_4H_4O_6$), oxalic acid ($C_2H_2O_4$), sorbic acid ($C_6H_8O_2$), fumaric acid ($HO_2CCH{=}CHCO_2H$), and a mixture thereof.

In various embodiments, the step of contacting the gold ion with the protein comprises mixing the protein with an auric acid, wherein the gold ion is derived from the auric acid, incubating the mixture at room temperature for about 3 hours to allow the gold ion to be transported into the inner cavity of the protein, and subjecting the incubated mixture to size-exclusion chromatography to desalt the incubated mixture. The auric acid may be chloroauric acid ($HAuCl_4$). The size-exclusion chromatography may be performed using a desalting column.

As used herein, the term "transport" may refer to the movement of ions through the pores in the protein. In this case, gold ion may be transported through the pores of a protein cage.

According to various embodiments, in the mixing step, the mixture of protein cage:auric acid may have a molar ratio of about 1:100 to about 1:10000, for example about 1:1000.

In the step of contacting the gold nanocluster seed in the inner cavity of the protein with the second reductant, an auric acid may be added. The auric acid, in an embodiment, may be chloroauric acid ($HAuCl_4$). The step of contacting the gold nanocluster seed in the inner cavity of the protein with the second reductant may be carried out by incubating overnight at room temperature. The incubation for the step of contacting the gold nanocluster seed in the inner cavity of the protein with the second reductant may be carried out for about 3 hours to about 12 hours, 3 hours to about 9 hours, 5 hours to about 9 hours, 7 hours to about 8 hours. In one embodiment, depending on the protein used, the incubation time may be up to a few days. In another embodiment, depending on the protein used, the contacting of the gold nanocluster seed in the inner cavity of the protein with the second reductant may be instant; thereby not requiring any incubation.

In various embodiments, the nanoparticle may grow until it matches the size of the inner cavity of the protein.

In a second aspect of the invention, a gold nanoparticle is provided, wherein the gold nanoparticle is fabricated using a method comprising the steps of contacting a gold ion with a protein, wherein the protein has an inner cavity that can accommodate the gold ion, separating the protein with the encapsulated gold ion(s) from non-encapsulated gold ions, contacting the protein-encapsulated gold ion with a first reductant to reduce the gold ion and form a gold nanocluster seed in the inner cavity of the protein, wherein the first reductant is a strong reducant, and contacting the gold nanocluster seed in the inner cavity of the protein with a second reductant to mineralize and grow the gold nanoparticle.

In various embodiments of this gold nanoparticle, the reductants and proteins used for its fabrication are as defined above.

In the context of various embodiments, the term "about" or "approximately" as applied to a numeric value encompasses the exact value and a variance of +/−5% of the value.

The phrase "at least substantially" may include "exactly" and a variance of +/−5% thereof. As an example and not limitation, the phrase "A is at least substantially the same as B" may encompass embodiments where A is exactly the same as B, or where A may be within a variance of +/−5%, for example of a value, of B, or vice versa.

The present invention provides a method to mineralize gold nanoparticles inside native horse spleen apoferritin (HSAFn) without manipulating or modifying the protein shell. Gold ions have a poor natural preference for the ferritin interior over that of the exterior, which thereby favors nanoparticle formation on the outside of the cage. Therefore, to encourage formation of particles only on the inside, a strategy is designed to trap a small number of gold ions inside the ferritin cavity and then isolate the encapsulated gold away from solution gold, which would have had the potential of mineralizing on the outside of the protein.

Subsequently the entrapped gold ions are rapidly reduced to form gold nanoclusters. Then, in a second reduction step, additional gold ions may be added along with a weak reductant that preferentially permits mineralization on the nanocluster seed. The nanoparticle would grow until it matches the size of the inner cavity and effectively stop when the shell of the protein cage restricts its growth.

A two-step reduction strategy such as this one can be amenable to nanoparticle growth inside almost any protein cage and this growth is limited by the size of the protein shell thus affording particles whose size can be rationally predicted before synthesis with virtually little optimization. Because second (or final) reduction occurs on a cluster, the production of particles with cores that are distinct from their shells is possible.

The strategy focuses on three main points: (1) how to keep the initial number of gold ions low inside the ferritin so that the majority of the particle growth happens during the second reduction; (2) how to isolate the ferritin encapsulated ions; and (3) how to control the selectivity of the reductions in each of the two steps.

To ensure that the number of gold ions is low inside the ferritin cage, anionic $AuCl_4^-$ as the gold source since the interior of the protein cage is negatively charged. Moreover, calculations of the ferritin electrostatic potential reveal that the field at the threefold axis is directed through the channels toward the inside of the cavity presumably to facilitate the transport of cations. Therefore, transport of gold anions into the cavity with a mechanism analogous to cations would be disfavored, thus ensuring a low number of gold ions present inside the cage.

To isolate the ferritin-entrapped ions, protein biochemical techniques such as size-exclusion chromatography is utilized to desalt the protein/gold ion solution since the method is able to isolate the protein with trapped ions in a mild way that keeps the protein cage intact.

To control the reduction selectivity the first reduction is executed with the strong reductant, $NaBH_4$, to form small gold clusters (HSFn-Au clusters) while the second reduction on the gold clusters to fill up the protein cavities with gold nanoparticles (HSFn-AuNPs) is achieved with the mild (weak) reducing agent, ascorbic acid, which is unable to reduce gold in the absence of mineralized seeds.

FIG. 1 shows a schematic representation of the two-step reduction strategy (procedure) to use HSAFn to mineralize gold nanoparticles. Gold clusters (HSFn-Au clusters) are mineralized inside HSAFn by reducing $AuCl_4^-$ trapped inside the ferritin cavity. The formation of gold nanoparticles (HSFn-AuNPs) is promoted by addition of ascorbic acid and additional $AuCl_4^-$.

To isolate pure and uniform-sized HSFn-AuNPs, gel filtration chromatography is applied to remove protein aggregations in the first purification step. Subsequently, another mild biochemical technique that separates based on density, ultracentrifugation through a sucrose gradient, is utilized to remove empty or incompletely mineralized ferritin. This mild, simple, and robust procedure yields highly homogeneous gold nanoparticles mineralized inside unmodified ferritin.

In order that the invention may be readily understood and put into practical effect, particular embodiments will now be described by way of examples and not limitations, and with reference to the figures.

EXAMPLES

Materials and Methods

HSAFn was obtained from Sigma-Aldrich and purified by fast protein liquid chromatography (FPLC, GE Healthcare) using gel filtration (Superdex 200 10/300 GL, 50 mM sodium phosphate, 150 mM NaCl, pH 7.0). Protein concentration was determined by bicinchoninic acid (BCA). Purified HSAFn (1 mL of a 1 mg·mL$^{-1}$ solution) was mixed with $HAuCl_4$ (22.6 µL of a 0.1 M solution; protein: $HAuCl_4$ molar ratio of 1:1000). The resulting homogeneous, pale-yellow solution was incubated at room temperature for about 3 hours and was applied to a desalting column (Sephadex G-25, 50 mM tris buffer, pH 7.5). The fractions containing protein were combined (1.5 mL) and NaBH$_4$ (20 μL of a 0.1 M solution) was added. The solution was inverted slowly for about 10 mins before unagitated incubation at room temperature for about 3 hours to water quench the remaining hydride. To the resulting light-reddish-brown solution, freshly dissolved ascorbic acid (30 μL of a 0.1 M solution) and HAuCl$_4$ (10 μL of a 0.1 M solution) were added, and it was incubated with no agitation overnight at room temperature. The resulting ruby-red solution was centrifuged (10000 rpm, about 10 mins) and the supernatant was purified by gel filtration (Superdex 200 10/300 GL, 50 mM sodium phosphate, 150 mM NaCl, pH 7.0). To isolate a homogeneous preparation of the HSFn-AuNPs, the sample was then applied to 20% to 60% sucrose gradient and centrifuged at 40000 rpm for about 5 hours. The bottom layer was collected and subjected to buffer exchange (50 mM tris, pH 7.5).

HSAFn, HSFn-Au clusters, and HSFn-AuNPs (100 μg~mL$^{-1}$) were analyzed by gel filtration (Superdex 200 10/300 GL, 50 mM sodium phosphate, 150 mM NaCl, pH 7.0) with monitoring at 280 nm (for protein) and 520 nm (for gold particles). UV/vis spectra of samples (100 μg·mL$^{-1}$) were recorded on a Cary 100 spectrophotometer from 700 nm to 250 nm. Samples were analyzed by native polyacrylamide gel electrophoresis with 4% stacking gel and 7% resolving gel and staining with Coomassie blue. Transmission electron microscopy (TEM) of all samples was obtained on a JEOL JEM-1400 microscope operating at 120 keV and negative stained with methylamine tungstate (Nano-W, Nanoprobes, Yaphank, N.Y.). Particle sizes were determined by image analysis (Image J., National Institutes of Health, USA, n=100). Data from HRTEM, EDX, and SAED were obtained by using a JEOL JEM-2100F operating at 200 keV.

UV/Vis Spectroscopy

Figure 2:
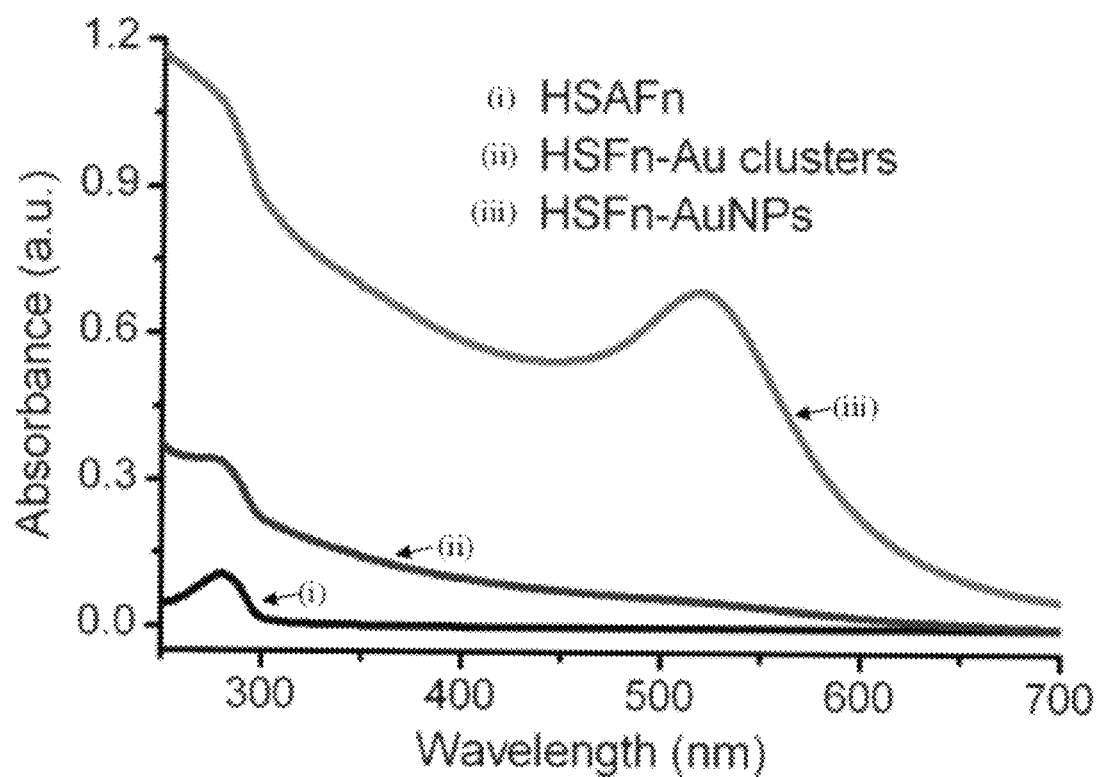
FIG. 2 shows UV/vis spectra of: (i) horse spleen apoferritin (HSAFn), (ii) gold clusters mineralized in horse spleen ferritin (HSFn-Au clusters), and (iii) gold nanoparticles mineralized in horse spleen ferritin (HSFn-AuNPs), in accordance to various embodiments.

Characterization of the intermediates of the method conducted by UV/vis spectroscopy. FIG. 2 shows UV/vis spectra of: (i) horse spleen apoferritin (HSAFn), (ii) gold clusters mineralized in horse spleen ferritin (HSFn-Au clusters), and (iii) gold nanoparticles mineralized in horse spleen ferritin (HSFn-AuNPs). The spectra of HSAFn, HSFn-Au clusters, and HSFn-AuNPs all revealed strong absorbance at 280 nm primarily due to the presence of the protein.

For the HSFn-AuNPs, an additional strong absorption peak at 519 nm was observed, indicating the characteristic surface plasmon resonance (SPR) of spherical gold nanoparticles less than 20 nm in diameter. In contrast, the HSFn-Au clusters exhibited no identifiable SPR, suggesting that the size of the mineral cores was less than 2 nm in diameter.

Size Exclusion Chromatography

Figure 3:
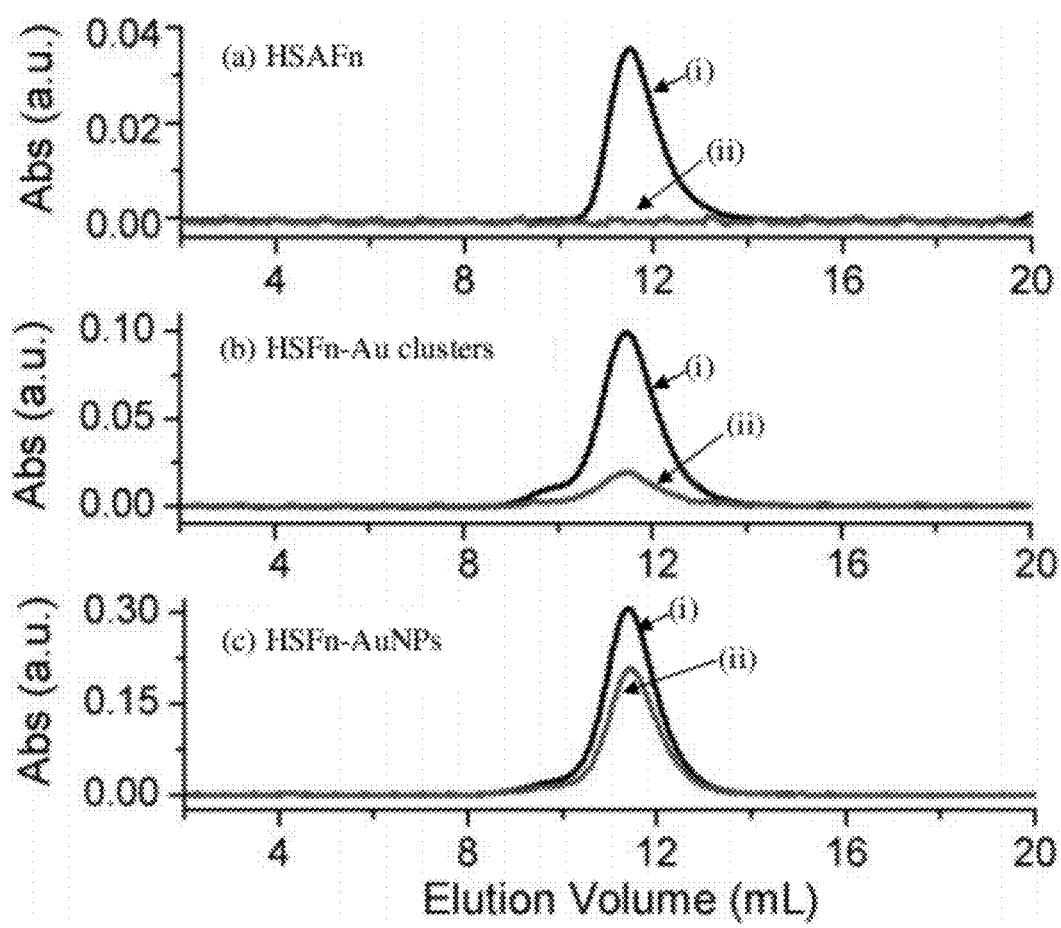
FIG. 3 shows size exclusion chromatography of: (a) horse spleen apoferritin (HSAFn), (b) gold clusters mineralized in horse spleen ferritin (HSFn-Au clusters), and (c) gold nanoparticles mineralized in horse spleen ferritin (HSFn-AuNPs), in accordance to various embodiments.

Size exclusion chromatography (SEC) was performed to determine if the gold nanoparticles were associated with intact ferritins. FIG. 3 shows size exclusion chromatography of: (a) horse spleen apoferritin (HSAFn), (b) gold clusters mineralized in horse spleen ferritin (HSFn-Au clusters), and (c) gold nanoparticles mineralized in horse spleen ferritin (HSFn-AuNPs). Elution profiles were measured at (i) 280 nm and (ii) 520 nm.

Figure 4A:
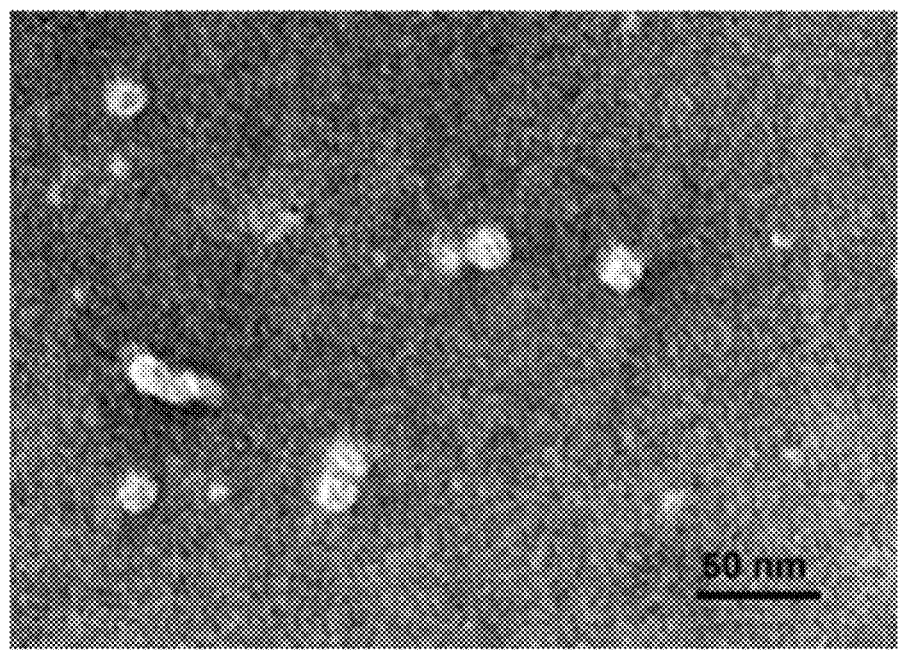
FIG. 4 shows the transmission electron microscopy (TEM) images of protein aggregations in the shoulder peaks of: (a) HSFn-Au clusters, and (b) HSFn-AuNPs after size exclusion chromatography, in accordance to various embodiments.
Figure 4B:
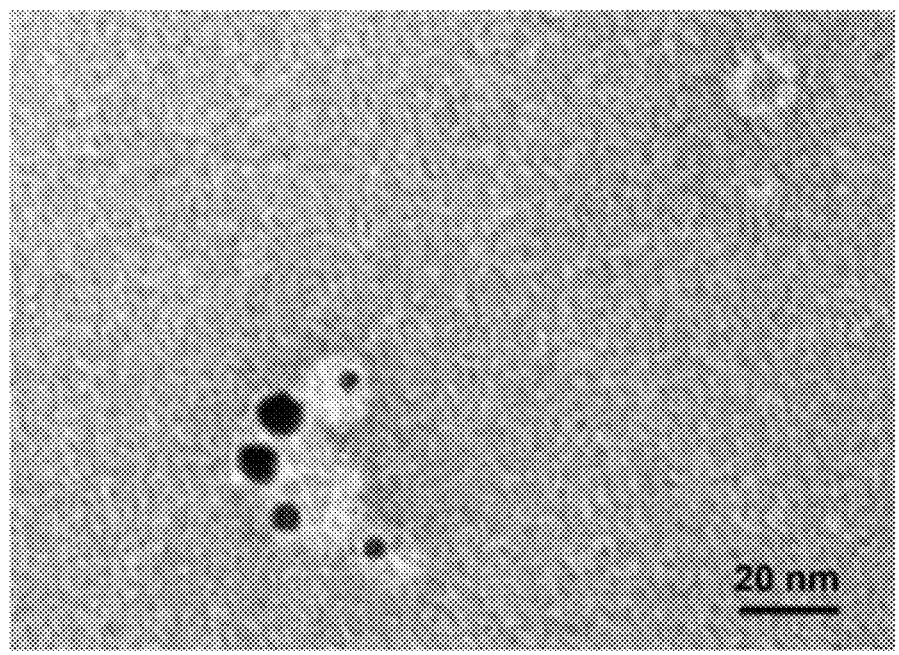

Mineralized and non-mineralized proteins were monitored at 280 nm (protein) and 520 nm (gold nanoparticle). The unmineralized HSAFn eluted at 11.5 mL, which was consistent with a self-assembled 24-mer protein cage. It exhibited no peak when observed at 520 nm. The elution profiles monitored at 280 nm for both the HSFn-AuNPs and HSFn-Au clusters resulted in peaks with identical elution volumes as HSAFn, implying that the protein cages were intact and endured no major alterations during mineralization, as observed from FIG. 3. In addition, the chromatograms of both HSFn-Au clusters and HSFn-AuNPs showed co-elution of protein and the presence of gold, suggesting that mineralization had occurred in association with the ferritin. Small shoulder peaks were observed in the elution profiles from both HSFn-Au clusters and the HSFn-AuNPs. These peaks were isolated and were characterized, and it was shown that since the conditions were non-native, a small amount of protein aggregation was formed during the reduction steps, as seen in FIG. 4 depicting the transmission electron microscopy (TEM) images of protein aggregations in the shoulder peaks of: (a) HSFn-Au clusters, and (b) HSFn-AuNPs after size exclusion chromatography.

Gel Electrophoresis

Figure 5:
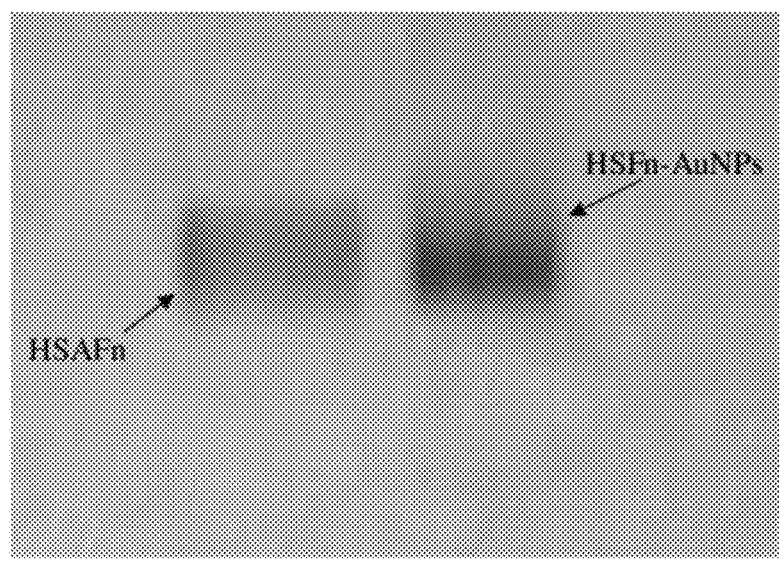
FIG. 5 shows an image of native gel electrophoresis of horse spleen apoferritin (HSAFn, left) and gold nanoparticles mineralized in horse spleen ferritin (HSFn-AuNPs, right), in accordance to various embodiments.

To further confirm that the gold nanoparticles were indeed integrated with the protein shells, HSAFn and HSFn-AuNPs were electrophoresed in a native polyacrylamide gel. FIG. 5 shows an image of native gel electrophoresis of horse spleen apoferritin (HSAFn, left) and gold nanoparticles mineralized in horse spleen ferritin (HSFn-AuNPs, right). Gel was stained with Coomassie blue. In FIG. 5, both HSAFn and HSFn-AuNPs were shown to exhibit bands with the same electrophoretic mobility, thereby suggesting that the overall charge of the ferritin was unchanged and the protein cage remained intact during the mineralization process. In addition, the band corresponding to HSFn-AuNPs was visibly red (indicating association between the protein and nanoparticles) prior to protein staining.

Transmission Electron Microscopy

Figure 6A:
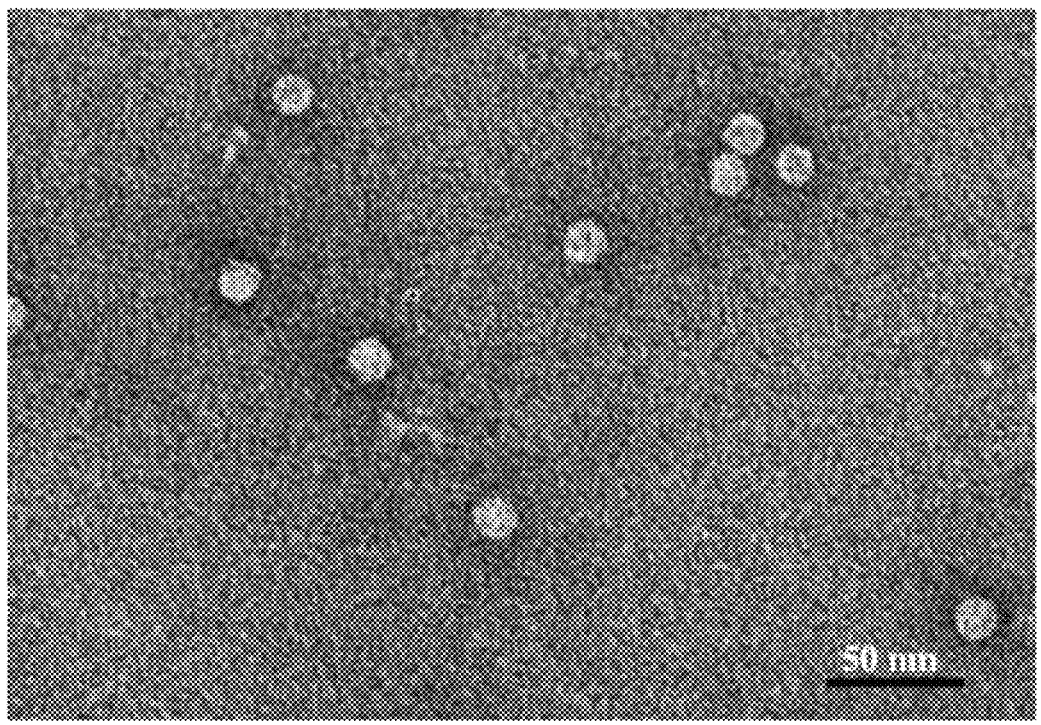
FIG. 6 shows transmission electron microscopy (TEM) images with negative staining conducted to visualize (a) HSAFn, (b) the HSFn-Au clusters, and (c) the HSFn-AuNPs, in accordance to various embodiments.
FIG. 6d shows a EDX spectrum of unstained HSFn-AuNPs, obtained on a copper grid, in accordance to various embodiments.
Figure 6B:
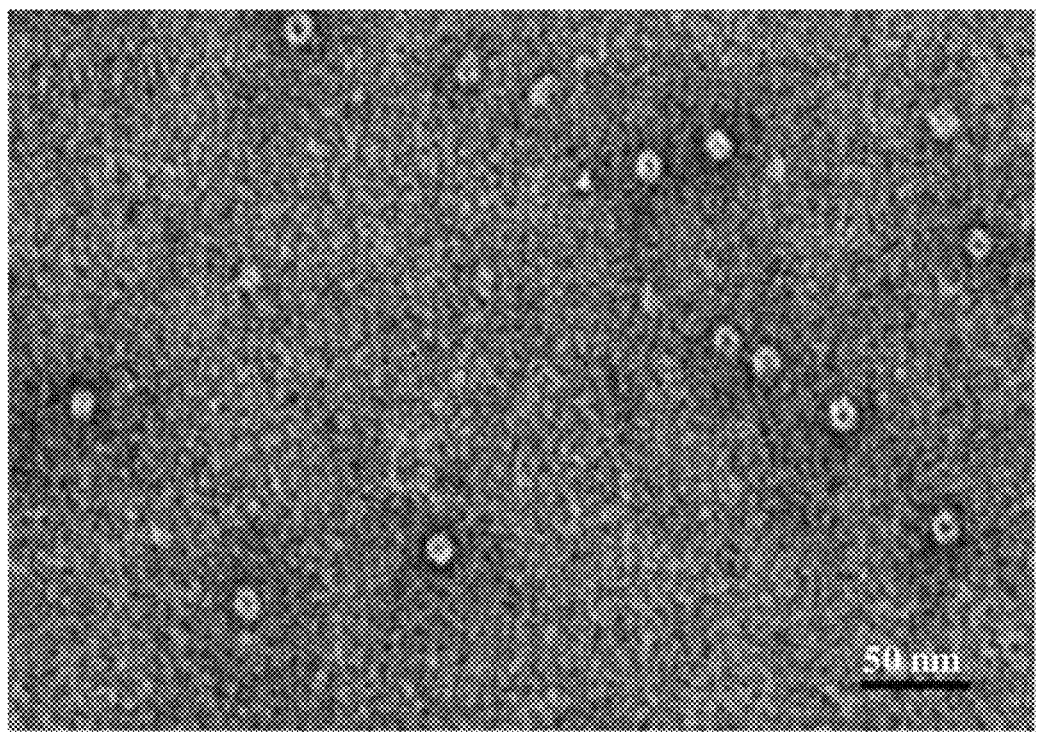
Figure 6C:
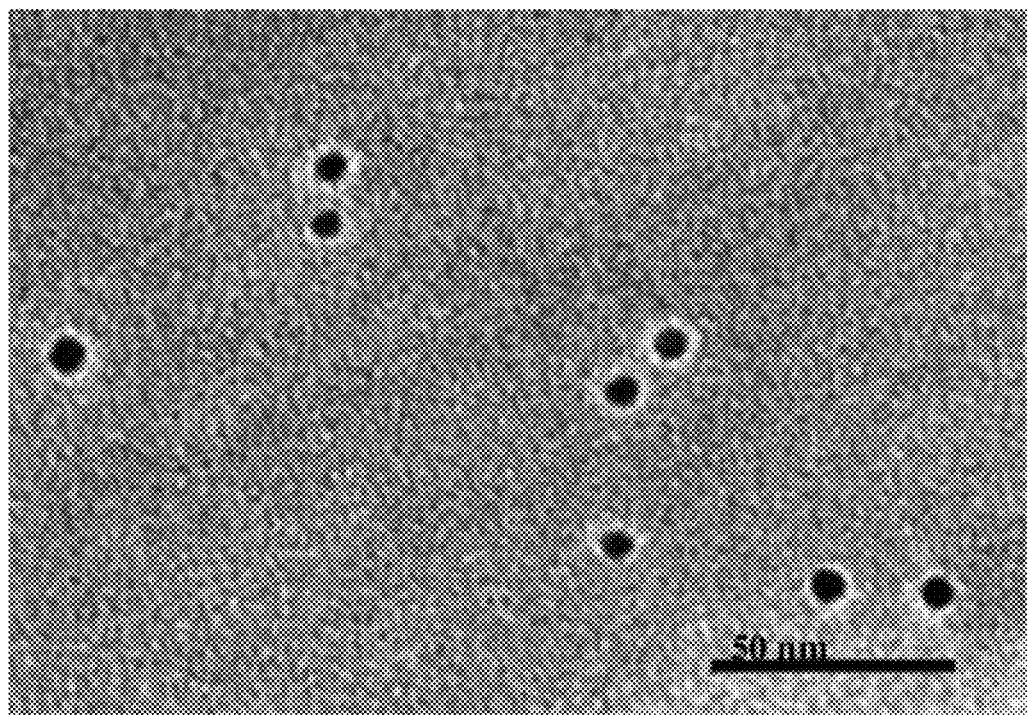

Transmission electron microscopy (TEM) with negative staining was conducted to visualize HSAFn, the HSFn-Au clusters, and the HSFn-AuNPs. The micrographs in FIG. 6a revealed that HSAFn self-assemble into cage-like structures with an average diameter of about 13.1±0.7 nm, which was consistent with previous literature reporting 12 nm. The HSFn-Au clusters were difficult to observe by TEM operating at 120 keV due to their small size and low electron density, as seen in FIG. 6b; however, the HSFn-AuNPs were visualized easily, and the gold nanoparticles appeared to be surrounded by intact protein shells as shown in FIG. 6c. In addition, the nanoparticles were monodisperse and spherical. The highly homogeneous population had an average diameter of about 6.3±0.8 nm, which was consistent with the interior dimension (7 nm) of the protein cage, suggesting that the protein was responsible for controlling the size.

Figure 6D:
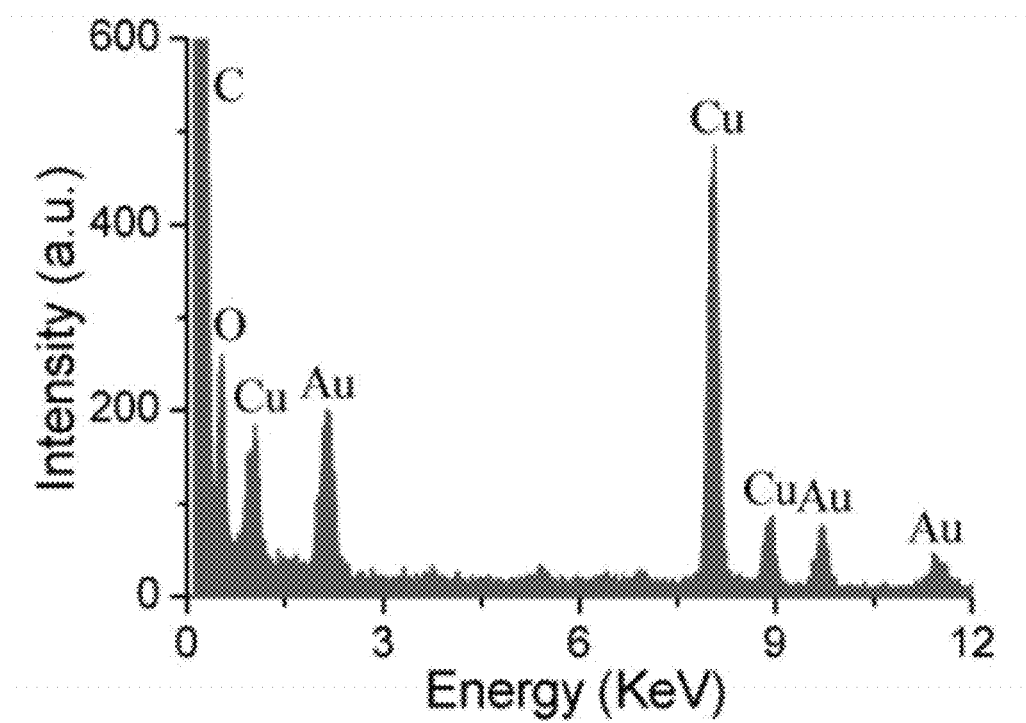

The elemental composition of the HSFn-AuNPs was determined using energy-dispersive X-ray (EDX) analysis. FIG. 6d shows a EDX spectrum of unstained HSFn-AuNPs, obtained on a copper grid. The spectrum in FIG. 6d showed Ma, Lα, and Lβ, Au peaks (2.1, 9.7, and 11.4 keV, respectively), which indicate the presence of Au in the protein core. Moreover, a C peak (at 0.27 keV) and three Cu peaks (at 0.9, 8.0, and 8.9 keV) were observed, which were attributed to the protein shell and the TEM grid.

High-Resolution TEM (HRTEM)

Figure 7A:
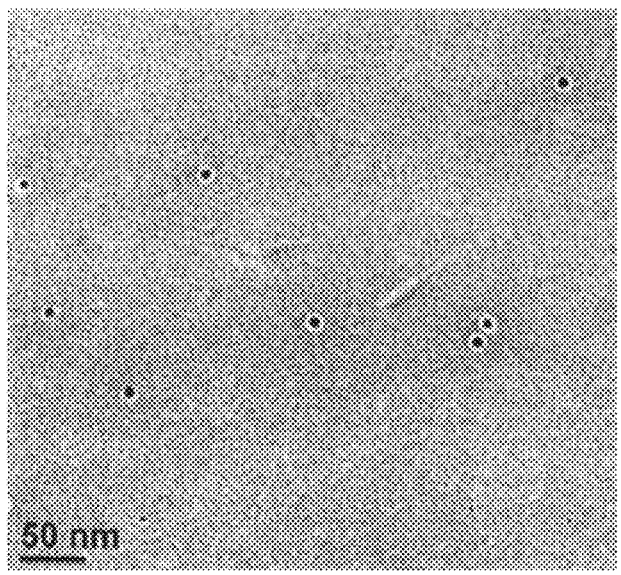
FIG. 7a shows a TEM image of unstained gold nanoparticles mineralized in horse spleen ferritin, in accordance to various embodiments.
Figure 7B:
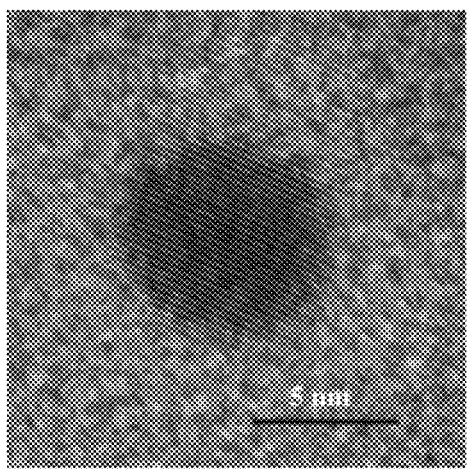
FIG. 7b shows a HRTEM image for a unstained gold nanoparticle mineralized in horse spleen ferritin, in accordance to various embodiments.
Figure 7C:
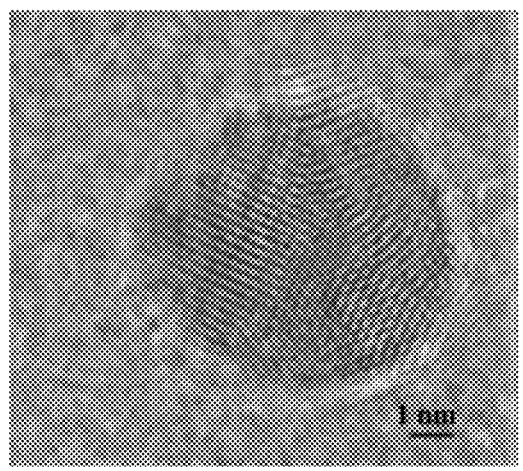
FIG. 7c shows a HRTEM image for another micrograph of the HSFn-AuNPs, indicating that some of them are polycrystalline.

The structure of the nanoparticles mineralized in the ferritin was investigated at the atomic scale by high-resolution TEM (HRTEM). FIG. 7a shows a TEM image of unstained gold nanoparticles mineralized in horse spleen ferritin and the micrograph of FIG. 7b shows a HRTEM image for a unstained gold nanoparticle mineralized in horse spleen ferritin. In FIG. 7b, an evident lattice indicating that the gold particles were single crystals was shown. However, other micrographs of the HSFn-AuNPs, such as in FIG. 7c, indicated that some of them were polycrystalline, suggesting that, in some cases, the gold crystals might be grown from one or more nucleation sites. Gold usually forms face-centered cubic (fcc) crystals. Measurement of the lattice spacings from the HRTEM image was 2.37 Å, corresponding to the value of the (111) facet of fcc gold crystals (2.36 Å).

Selected-Area Electron Diffraction (SAED) Patterns

Figure 8:
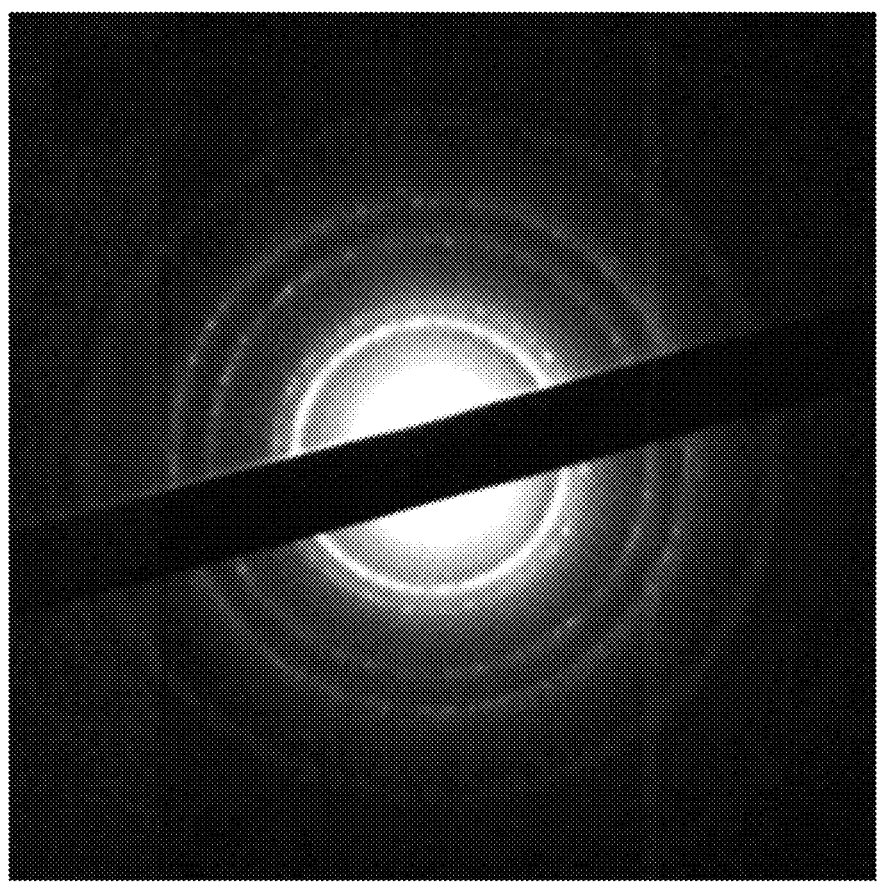
FIG. 8 shows a SAED pattern for the unstained gold nanoparticles mineralized in horse spleen ferritin, in accordance to various embodiments.

To further understand the crystal structure of the gold particles, selected-area electron diffraction (SAED) patterns from a large number of particles were obtained. FIG. 8 shows a SAED pattern for the unstained gold nanoparticles mineralized in horse spleen ferritin. The camera length was 20 cm. The observed d-spacings at 2.4, 2.1, 1.5, 1.3, and 0.97 Å corresponded to miller indices of (111), (200), (220), (311), and (331) in fcc gold crystals respectively as summarized in Table 1.

TABLE 1

Theoretical and observed d-spacings for gold nanoparticles mineralized in horse spleen ferritin.

| d-spacing [Å] | Measured d-spacing [Å] | hkl |
|---|---|---|
| 2.4 | 2.4 | 111 |
| 2.0 | 2.1 | 200 |
| 1.4 | 1.5 | 220 |
| 1.2 | 1.3 | 311 |
| 0.94 | 0.97 | 331 |

Figure 9A:
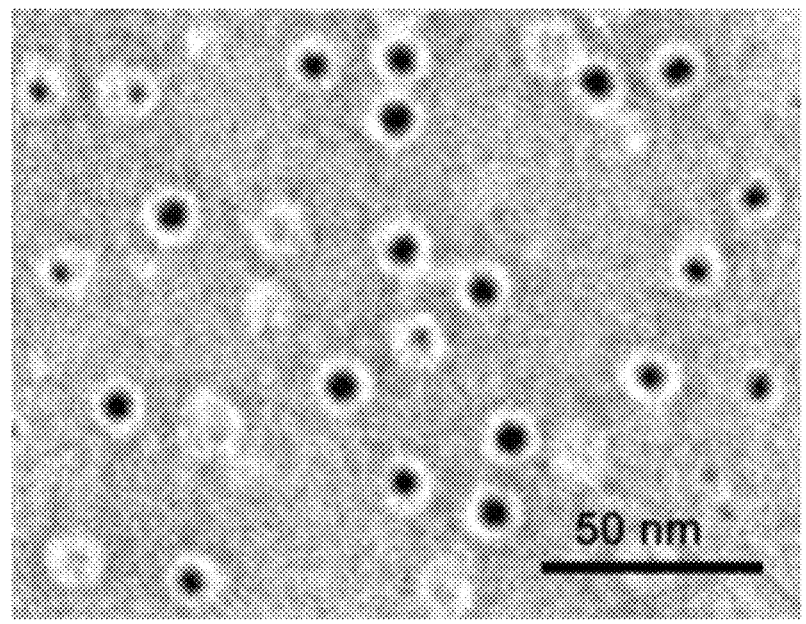
FIG. 9 shows TEM images of HSFn-AuNPs: (a)-(b) before sucrose gradient ultracentrifugation; and (c) to (f) after sucrose gradient ultracentrifugation, in accordance to various embodiments.
Figure 9B:
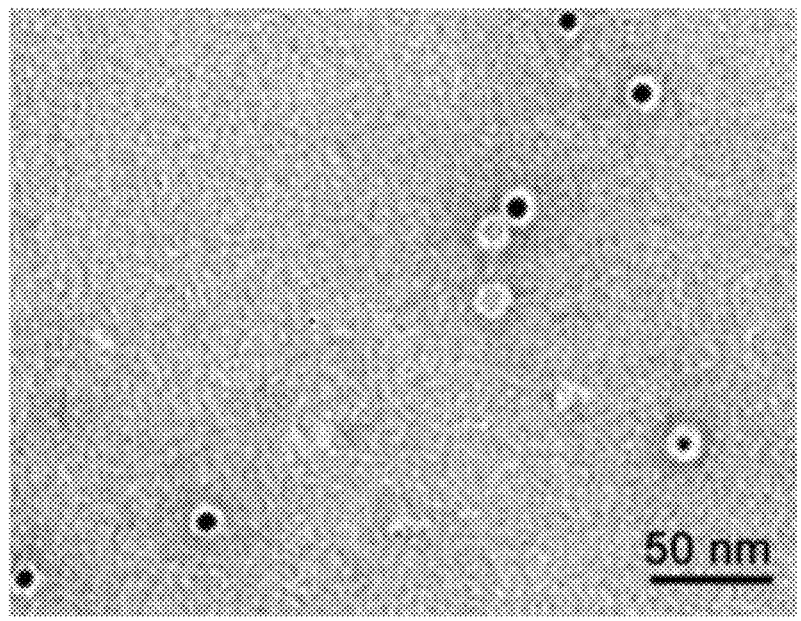
Figure 9C:
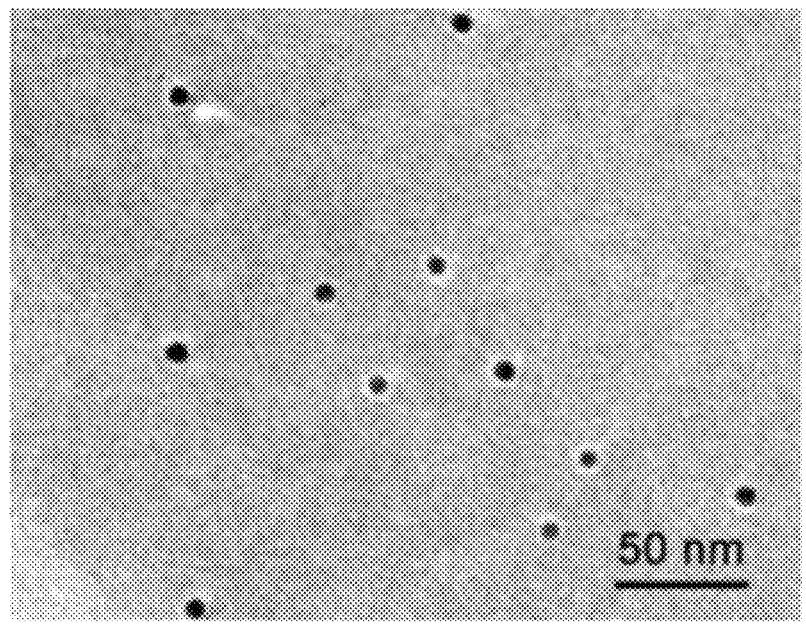
Figure 9D:
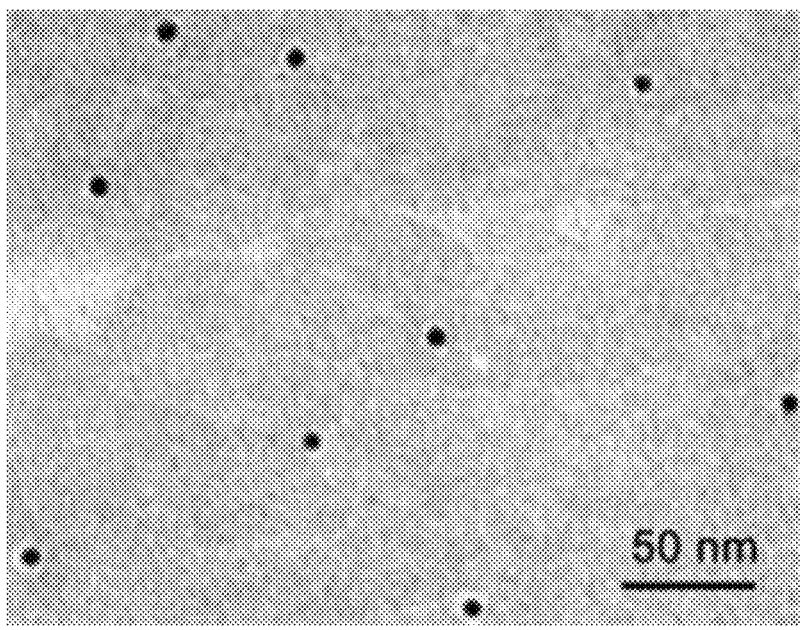
Figure 9E:
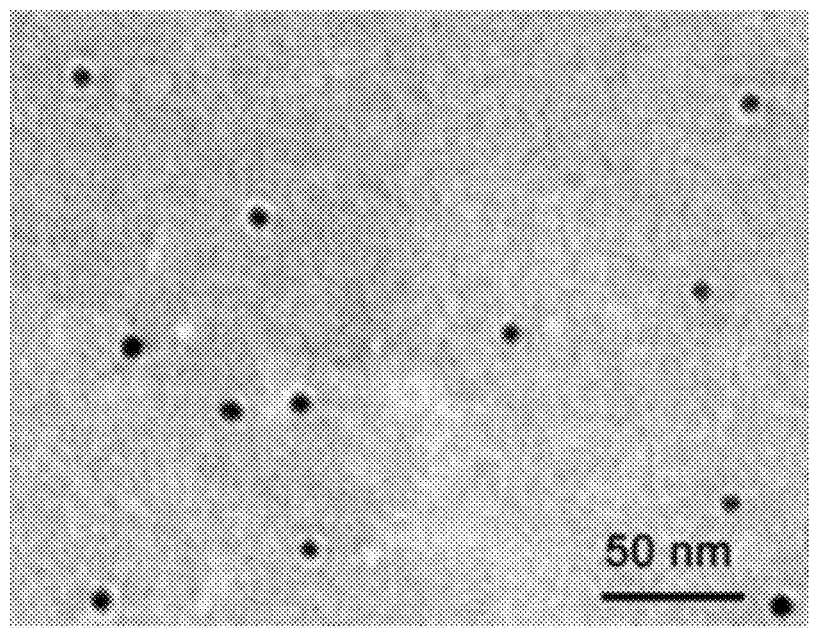
Figure 9F:
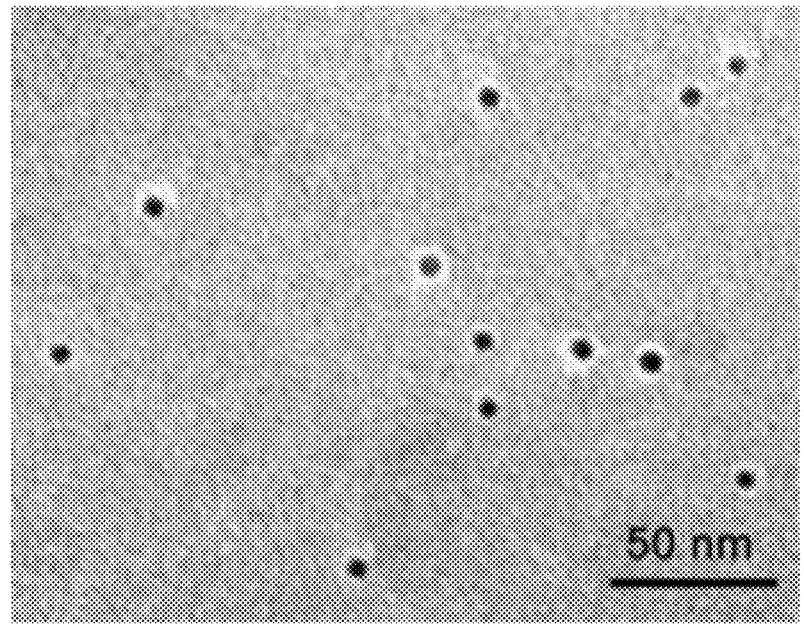

After the HSFn AuNPs were synthesized, gel filtration chromatography was applied to remove the protein aggregates. However, as this technique separated based on size differences, the resulting HSFn-AuNPs preparation had 40±3% empty or incompletely mineralized ferritins, as seen in FIGS. 9a and 9b.

A homogeneous preparation of HSFn-AuNPs was obtained after sucrose gradient ultracentrifugation, which resulted in 94±2% of the ferritins filled with nanoparticles with an average diameter of about 6.3±0.8 nm, as seen in FIGS. 9c to 9f, each showing an image of a different sample subject to the same conditions. As can be observed, reproducibility was achieved.

Control Example

Figure 10A:
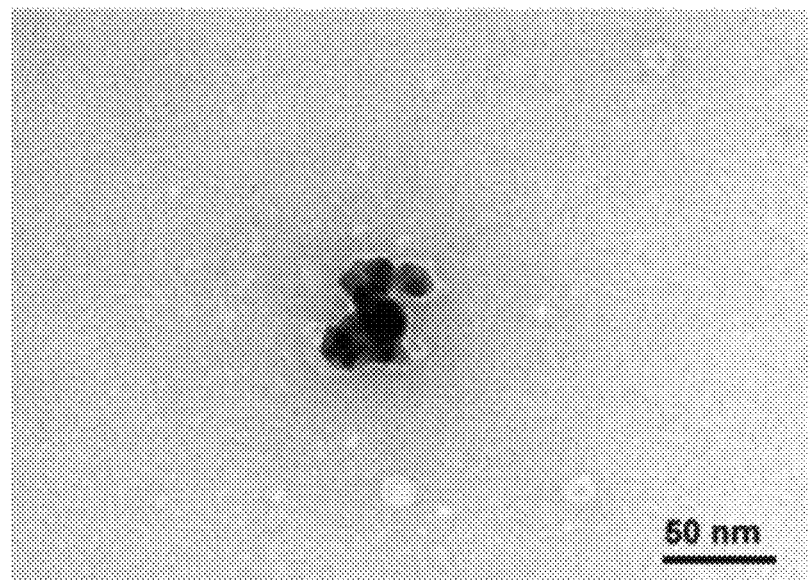
FIG. 10a shows a TEM image of a large, non-uniform gold structures formed, in accordance to various embodiments.
Figure 10B:
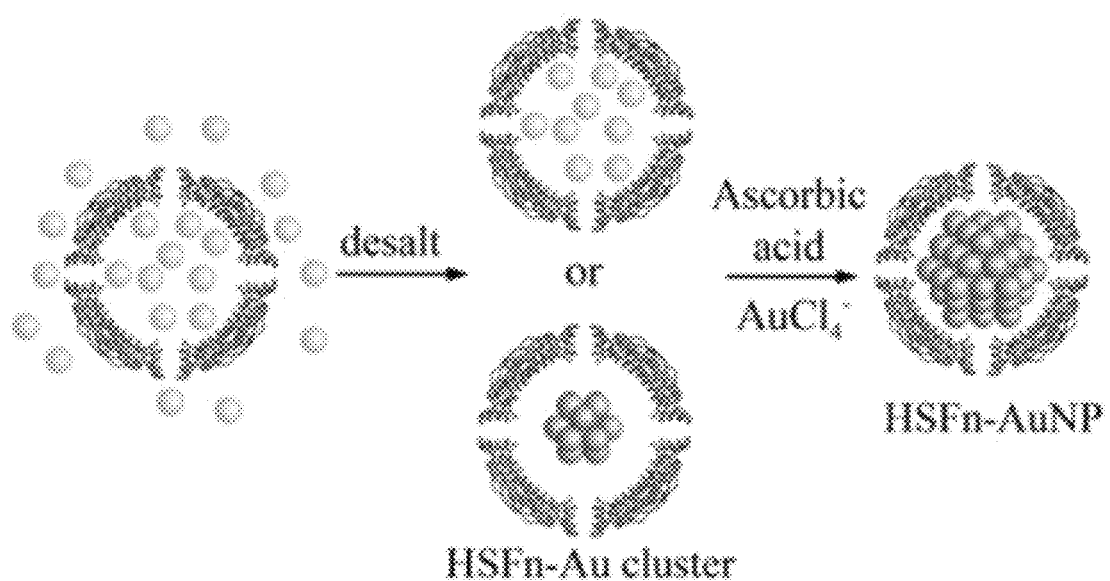
FIG. 10b shows schematic representation of a control example to determine the necessity of both reduction steps and whether the clusters are formed inside the ferritins before the first reduction, in accordance to various embodiments.

To verify the necessity of both reduction steps in the fabrication procedure, a control example was designed to determine whether clusters were present after desalting but before the first reduction. If they were, treating them with ascorbic acid and $AuCl_4^-$ should result in nanoparticles fully filling the protein cavity. This example gave rise to a deep-blue solution after only a few minutes, and TEM visualization indicated that only large, non-uniform gold structures were formed, as observed in FIG. 10a. This suggested as illustrated in the schematic representation of FIG. 10b that either there were no gold nanoclusters formed until the initial reduction or that some sort of clusters existed both before and after the first reduction, but they were not the same species. Moreover, this example emphasized that both reduction steps were indeed essential.

Accordingly, a new two-step method to produce gold nanoparticles inside ferritin protein cages that requires no modification of the protein is provided. The formation of nanoparticles on the exterior could be suppressed by first loading gold anions into the cage followed by removal of the excess ions in solution immediately before reacting with the first reductant. The resulting clusters are then used to seed nanoparticle formation by slow reduction. It is shown that highly monodisperse nanocrystals are formed within intact protein shells and the size of the nanoparticles correlates with the interior diameter of the cages.

Gold nanoparticles are of immense interest due to their multiple applications and the mild and flexible fabrication method in accordance to various embodiments could aid in a plurality of research areas. In addition, the protein surface could be easily modified through chemical and genetic methods to direct other functions for further applications. The strategy of first forming clusters within the protein cages to nucleate nanoparticle growth could be used to synthesize core/shell or alloy nanoparticles inside ferritins. Importantly, the method does not require any modification of the protein and this means that it could be readily amenable to any cage protein whether they are altered structural variants of the ferritins or viruses.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. Method for fabricating a gold nanoparticle, the method comprising the steps of:
    contacting a gold ion with a protein, wherein the protein has an inner cavity that can accommodate the gold ion;
    separating the protein with the encapsulated gold ion(s) from non-encapsulated gold ions;
    contacting the protein-encapsulated gold ion with a first reductant to reduce the gold ion and form a gold nanocluster seed in the inner cavity of the protein by adding the first reductant to a solution comprising the protein-encapsulated gold ion, wherein the first reductant is a strong reductant; and
    contacting the gold nanocluster seed in the inner cavity of the protein with a second reductant to mineralize and grow the gold nanoparticle by separately adding the second reductant to the solution after the first reductant is added to the solution, wherein the second reductant is a weak reductant.

2. The method as claimed in claim 1, wherein the strong reductant is selected from the group consisting of sodium borohydride ($NaBH_4$), diborane ($B_2H_6$), diisobutylaluminum hydride (($i$-$Bu_2AlH)_2$), lithium triethylborohydride ($LiEt_3BH$), potassium borohydride ($H_4BK$), diborane ($B_2H_6$), amineborane, ammonia borane ($H_3NBH_3$) dimethylamine borane (($CH_3)_2NH:BH_3$), and a mixture thereof.

3. The method as claimed in claim 1, wherein the weak reductant is selected from the group consisting of ascorbic acid ($C_6H_8O_6$) and a salt thereof, citrate, potassium bitartrate ($KC_4H_5O_6$), potassium tartrate ($K_2C_4H_4O_6$), L-cysteine, thioglycerol, sodium tartrate ($Na_2C_4H_4O_6$), oxalic acid ($C_2H_2O_4$), sorbic acid ($C_6H_8O_2$), fumaric acid ($HO_2CCH=CHCO_2H$), and a mixture thereof.

4. The method as claimed in claim 1, wherein the protein is selected from the group consisting of Horse Spleen Apoferritin (HAS), ferritin, ferritin-like protein, apoferritin, viral capsid, vault protein, and Dps (DNA-binding proteins from starved cells) protein.

5. The method as claimed in claim 1, wherein the step of contacting the gold ion with the protein comprises
    mixing the protein with an auric acid, wherein the gold ion is derived from the auric acid;

incubating the mixture at room temperature for about 3 hours to allow the gold ion to be transported into the inner cavity of the protein; and subjecting the incubated mixture to size-exclusion chromatography to desalt the incubated mixture.

6. The method as claimed in claim 5, wherein the auric acid is chloroauric acid ($HAuCl_4$).

7. The method as claimed in claim 5, wherein in the mixing step, the mixture of protein cage:auric acid has a molar ratio of about 1:1000.

8. The method as claimed in claim 5, wherein the size-exclusion chromatography is performed using a desalting column.

9. The method as claimed in claim 1, wherein in the step of contacting the gold nanocluster seed in the inner cavity of the protein with the second reductant, an auric acid is added.

10. The method as claimed in claim 9, wherein the auric acid is chloroauric acid ($HAuCl_4$).

11. The method as claimed in claim 1, wherein the step of contacting the gold nanocluster seed in the inner cavity of the protein with the second reductant is carried out by incubating overnight at room temperature.

12. The method as claimed in claim 11, wherein the nanoparticle grows until it matches the size of the inner cavity of the protein.

* * * * *